US007748156B2

(12) United States Patent
Blum (10) Patent No.: US 7,748,156 B2
(45) Date of Patent: Jul. 6, 2010

(54) FISHING APPARATUS UTILIZING REMOTE CONTROLLED BOAT

(76) Inventor: Arlin Curtis Blum, 1517 Paramount, Novi, MI (US) 48377

( * ) Notice: Subject to any disclaimer, the term of this patent is extended or adjusted under 35 U.S.C. 154(b) by 114 days.

(21) Appl. No.: 12/005,782

(22) Filed: Dec. 28, 2007

(65) Prior Publication Data

US 2009/0165356 A1 Jul. 2, 2009

(51) Int. Cl.
*A01K 91/06* (2006.01)
*A01K 91/02* (2006.01)
(52) U.S. Cl. .................... 43/26.1; 43/43.12; 43/27.4; 43/4
(58) Field of Classification Search ............... 43/26.1, 43/4, 43.12, 27.4; 114/213–217, 230.26, 114/252, 253, 242, 249; 446/160, 163–165, 446/153
See application file for complete search history.

(56) References Cited

U.S. PATENT DOCUMENTS

| 575,748 | A | * | 1/1897 | Williamson | 114/249 |
| 2,170,594 | A | * | 8/1939 | Nicholson | 43/43.12 |
| 2,597,288 | A | * | 5/1952 | Caldwell | 43/43.12 |
| 2,709,316 | A | * | 5/1955 | McCabe | 43/26.1 |
| 2,749,648 | A | * | 6/1956 | Schneider | 43/43.12 |
| 2,803,914 | A | * | 8/1957 | Ellis | 43/26.1 |
| 2,830,400 | A | * | 4/1958 | Perry | 43/43.12 |
| 2,872,889 | A | * | 2/1959 | Johnson | 114/253 |
| 2,907,295 | A | * | 10/1959 | Delaney | 114/253 |
| 2,920,598 | A | * | 1/1960 | Nielsen | 114/253 |
| 2,929,348 | A | * | 3/1960 | Jackson | 114/253 |
| 2,943,591 | A | * | 7/1960 | Schneider | 114/253 |
| 2,944,507 | A | * | 7/1960 | Beal | 114/253 |
| 2,959,884 | A | * | 11/1960 | Lemay | 43/43.12 |
| 2,974,625 | A | * | 3/1961 | Lang | 114/253 |
| 3,034,469 | A | * | 5/1962 | Allen | 114/253 |
| 3,034,470 | A | * | 5/1962 | Vanderfeltz et al. | 114/253 |
| 3,056,977 | A | * | 10/1962 | McGuire | 114/253 |
| D195,068 | S | * | 4/1963 | Griparis | 114/253 |
| 3,103,005 | A | * | 9/1963 | Hills | 114/253 |
| 3,106,796 | A | * | 10/1963 | Friedland | 43/26.1 |
| 3,110,331 | A | * | 11/1963 | Buchanan | 114/252 |
| 3,134,356 | A | * | 5/1964 | Holtshouser | 114/253 |
| RE25,650 | E | * | 10/1964 | Strumpf | 43/43.12 |
| 3,203,131 | A | * | 8/1965 | Myers | 43/26.1 |
| 3,294,053 | A | * | 12/1966 | Emery, Jr. | 114/253 |
| 3,336,894 | A | * | 8/1967 | Eisner | 114/253 |
| 3,358,399 | A | * | 12/1967 | Waldmann | 43/43.12 |
| 3,390,658 | A | * | 7/1968 | Jelks | 114/242 |
| 3,417,726 | A | * | 12/1968 | Marino | 114/253 |
| 3,435,552 | A | * | 4/1969 | Caldwell | 43/27.4 |
| 3,462,870 | A | * | 8/1969 | Terilli | 43/43.12 |
| 3,513,583 | A | * | 5/1970 | Leash et al. | 43/43.12 |
| 3,602,188 | A | * | 8/1971 | Penaflor | 114/253 |
| 3,650,237 | A | * | 3/1972 | Hartman | 114/253 |
| 3,659,370 | A | * | 5/1972 | Ritter | 43/43.12 |
| 3,685,196 | A | * | 8/1972 | Scott | 43/43.12 |
| 3,710,500 | A | * | 1/1973 | Pena | 43/26.1 |
| 3,765,118 | A | * | 10/1973 | Reitler | 43/43.12 |
| 3,838,660 | A | * | 10/1974 | Frisbee | 114/253 |

(Continued)

*Primary Examiner*—Darren W Ark (57) ABSTRACT

A fishing apparatus that utilizes a remote controlled boat to remotely deliver the hooked portion of a fishing line to the desired fishing area on the water is disclosed. The remote controlled boat includes a fishing line guide attached thereto. The fishing line guide includes a quick-release attachment portion to which a quick-release pad with fishing line is attached.

14 Claims, 12 Drawing Sheets

U.S. PATENT DOCUMENTS

| | | | | |
|---|---|---|---|---|
| 3,890,918 | A | * | 6/1975 | Sell .......................... 114/253 |
| 3,911,609 | A | * | 10/1975 | Baya .......................... 43/26.1 |
| 3,919,801 | A | * | 11/1975 | Bart .......................... 43/43.12 |
| 3,919,963 | A | * | 11/1975 | Cox, III .................... 114/253 |
| 3,949,698 | A | * | 4/1976 | Sell .......................... 114/253 |
| 4,028,840 | A | * | 6/1977 | Wille ........................ 43/43.12 |
| 4,030,441 | A | * | 6/1977 | Nagata et al. ............. 114/242 |
| 4,031,652 | A | * | 6/1977 | Johnson .................... 43/43.12 |
| 4,069,611 | A | * | 1/1978 | Dusich et al. ............. 43/43.12 |
| 4,125,958 | A | * | 11/1978 | Cote .......................... 43/43.12 |
| 4,161,077 | A | * | 7/1979 | Ciaccio et al. ............. 43/26.1 |
| 4,177,599 | A | * | 12/1979 | Pettersen .................. 43/43.12 |
| 4,213,413 | A | * | 7/1980 | Courtney .................. 114/253 |
| 4,339,888 | A | * | 7/1982 | Sheng-Jung ............. 43/26.1 |
| 4,395,841 | A | * | 8/1983 | Cudnohufsky ........... 43/43.12 |
| 4,453,336 | A | * | 6/1984 | Lowden .................... 43/43.12 |
| 4,494,334 | A | * | 1/1985 | Porter ....................... 43/43.12 |
| 4,538,372 | A | * | 9/1985 | Petigoretz ................. 43/43.12 |
| 4,565,026 | A | * | 1/1986 | Bohme ...................... 43/43.12 |
| 4,625,450 | A | * | 12/1986 | Roemer, Jr. ............... 43/43.12 |
| 4,628,630 | A | * | 12/1986 | Bohme ...................... 43/43.12 |
| 4,635,391 | A | * | 1/1987 | Early ......................... 43/26.1 |
| 4,648,194 | A | * | 3/1987 | Carroll, Jr. ................ 43/19 |
| 4,696,124 | A | * | 9/1987 | Wille ......................... 43/43.12 |
| 4,757,633 | A | * | 7/1988 | Van Cleve ................ 43/26.1 |
| 4,813,172 | A | * | 3/1989 | McCue ...................... 43/43.12 |
| 4,817,328 | A | * | 4/1989 | Hartley et al. ............. 43/43.12 |
| 4,856,222 | A | * | 8/1989 | Hannam .................... 43/26.1 |
| 4,920,689 | A | * | 5/1990 | Anderson .................. 43/26.1 |
| 4,928,420 | A | * | 5/1990 | Jackson ..................... 43/27.4 |
| 4,942,690 | A | * | 7/1990 | Lund ......................... 43/43.12 |
| 4,945,670 | A | * | 8/1990 | Wetherald ................. 43/43.12 |
| 4,974,359 | A | * | 12/1990 | Zajic ......................... 43/43.12 |
| 5,016,385 | A | * | 5/1991 | Blease ....................... 43/43.12 |
| 5,033,226 | A | * | 7/1991 | Jackson ..................... 43/43.12 |
| 5,086,581 | A | * | 2/1992 | Barra et al. ................ 43/26.1 |
| 5,154,016 | A | * | 10/1992 | Fedora et al. .............. 43/26.1 |
| 5,165,193 | A | * | 11/1992 | Dankwardt ................. 43/26.1 |
| 5,170,581 | A | * | 12/1992 | Lyons ....................... 43/43.12 |
| 5,191,852 | A | * | 3/1993 | Rupp ......................... 43/27.4 |
| 5,201,884 | A | * | 4/1993 | Nicholas .................... 43/26.1 |
| 5,243,927 | A | * | 9/1993 | Messick ..................... 43/27.4 |
| 5,245,780 | A | * | 9/1993 | Hansen et al. .............. 43/27.4 |
| 5,293,712 | A | * | 3/1994 | Lo ............................. 43/26.1 |
| 5,301,451 | A | * | 4/1994 | VanAssche ................ 43/27.4 |
| 5,309,664 | A | * | 5/1994 | Wright ...................... 43/26.1 |
| 5,361,530 | A | * | 11/1994 | Kashani et al. ............ 43/26.1 |
| 5,363,587 | A | * | 11/1994 | Nordling .................... 43/26.1 |
| 5,581,932 | A | * | 12/1996 | Bell ........................... 43/26.1 |
| 5,695,372 | A | * | 12/1997 | Hilleren ...................... 114/253 |
| 5,806,232 | A | * | 9/1998 | James ........................ 43/26.1 |
| 5,921,015 | A | * | 7/1999 | Newell et al. .............. 43/43.12 |
| 6,092,326 | A | * | 7/2000 | Strome ...................... 43/43.12 |
| 6,122,852 | A | * | 9/2000 | Mechling, IV ............. 43/26.1 |
| 6,263,611 | B1 | * | 7/2001 | Kimura ...................... 43/26.1 |
| 6,389,732 | B1 | * | 5/2002 | Daniel ........................ 43/26.1 |
| 6,412,211 | B1 | * | 7/2002 | Smith ........................ 43/4 |
| 6,450,114 | B1 | * | 9/2002 | Conroy ...................... 43/4 |
| 6,453,839 | B2 | * | 9/2002 | Roeseler et al. ............ 114/253 |
| 6,474,584 | B2 | * | 11/2002 | Ekich ......................... 43/4 |
| 6,487,984 | B1 | | 12/2002 | Pape et al. |
| 6,520,105 | B2 | * | 2/2003 | Koda et al. ................. 43/26.1 |
| 6,561,860 | B2 | | 5/2003 | Colyvas |
| 6,568,344 | B2 | | 5/2003 | Burlet |
| 6,631,690 | B2 | | 10/2003 | Mambretti |
| 6,925,746 | B2 | * | 8/2005 | Huikari ...................... 43/26.1 |
| 7,143,541 | B2 | * | 12/2006 | Buero ........................ 43/43.12 |
| 7,152,362 | B2 | * | 12/2006 | Holbrook .................... 43/43.12 |
| 7,343,709 | B2 | * | 3/2008 | van Weenen ............... 43/43.12 |
| 7,516,713 | B1 | * | 4/2009 | Franta ........................ 114/230.26 |
| 7,581,506 | B2 | * | 9/2009 | Whitney ..................... 114/249 |
| 2001/0006037 | A1 | * | 7/2001 | Badley ....................... 114/253 |
| 2002/0125367 | A1 | | 9/2002 | Killingsworth |
| 2004/0002281 | A1 | * | 1/2004 | Rudell et al. ............... 446/153 |
| 2006/0059766 | A1 | * | 3/2006 | Huikari ...................... 43/26.1 |
| 2007/0006516 | A1 | * | 1/2007 | LaCroix, Jr. ............... 43/26.1 |
| 2008/0271357 | A1 | * | 11/2008 | Easterby .................... 43/26.1 |
| 2009/0308984 | A1 | * | 12/2009 | Hardham et al. ........... 114/253 |

\* cited by examiner

FISHING APPARATUS UTILIZING REMOTE CONTROLLED BOAT

FIELD OF THE INVENTION

The present invention relates to a fishing apparatus that utilizes a remote controlled boat. More particularly, the present invention relates to a fishing apparatus comprising a remote controlled fishing boat having a fishing line guide attached thereto for remotely delivering the hooked portion of the fishing line to the desired fishing area on the water.

DESCRIPTION OF THE PRIOR ART

In sports fishing it is often desired to drop the fishing line in an area that is normally difficult to reach by boat or by land. In some waters the most desirable fishing is frequently in areas that are either too shallow or are too vegetated or possibly both, making maneuvering by a boat, even one with a shallow draw, difficult or impossible. These same highly—desired fishing areas may also be too far away for land-based fishing.

To overcome this difficulty it has been envisioned in the past for the sports fisherman to have the hooked portion of the fishing line taken to the remote or difficult-to-reach desired fishing area by a remote aquatic vehicle, such as a remote controlled boat. Such boats typically include an antenna, a conventional remote control signal receiver, a steering element, an interface to deliver translated signals received by the remote control signal receiver to the steering element, a motor, and a source of electric power such as a rechargeable battery. To adapt them for remote fishing, such boats are fitted with a fishing guide line attachment to which a portion of a fishing line is attached.

Examples of embodiments of the remote controlled fishing apparatus may be found in several granted U.S. Patents including: U.S. Pat. No. 2,693,047, issued to Lumsden for "FISHING LINE TOWING DEVICE"; U.S. Pat. No. 3,099,099, issued to Cahen et al. for "FISHING DEVICES"; U.S. Pat. No. 3,613,284, issued to Anderson for "FISHING DEVICE"; U.S. Pat. No. 4,161,077, issued to Ciaccio for "RADIO CONTROLLED FISHING APPARATUS"; and U.S. Pat. No. 6,520,105, issued to Koda et al. for "REMOTE CONTROL UNMANNED FISHING BOAT AND DEVICE FOR REMOTE CONTROL THEREOF."

However, while apparently providing improvements in the art of the remote controlled fishing apparatus, there remains room for improvement. Accordingly, the present invention provides advantages in the art of the remote controlled fishing apparatus not previously disclosed by or suggested in the known art.

SUMMARY OF THE INVENTION

The present invention overcomes the limitations of the prior art by providing a fishing apparatus that utilizes a remote controlled boat to efficiently and effectively remotely deliver the hooked portion of a fishing line to the desired fishing area on the water. The remote controlled boat includes a fishing line guide attached thereto. The fishing line guide includes a quick-release attachment portion to which a quick-release pad with fishing line is attached.

As is known in the art, the remote controlled boat includes an antenna, a conventional remote control signal receiver, a steering element, an interface to deliver translated signals received by the remote control signal receiver to the steering element, a motor, and a source of electric power such as a rechargeable battery. In addition, the remote controlled boat of the present invention includes a fishing line guide. The fishing line guide includes a frame removably attachable to the boat hull and a quick-release attachment plate. A quick-release pad is attached to a selected area on the fishing line. The quick-release pad with the fishing line attached is releasably attached to the quick-release attachment plate by hook-and-loop fastenings. The quick-release pad may be strategically placed on the quick-release attachment plate such that the tension need to effect release may be adjusted according to the type of fish sought by the fisherman. Brackets are fitted to the boat hull to releasably receive the frame of the fishing guide.

Accordingly, an object of the present invention is to provide a fishing apparatus which allows for the remote controlled guidance of the hooked end of the fishing line to a desired fishing location.

Another object of the present invention is to provide an apparatus in which a fishing line guide may be quickly and easily fitted to a remote controlled fishing boat.

A further object of the present invention is to provide a quick-release arrangement for attaching the fishing line to the fishing line guide.

Still an additional object of the present invention is to provide a quick-release arrangement which may be easily adjusted for release tension depending on the placement of the fishing line pad on the quick-release attachment plate.

Further scope of the applicability of the present invention will become apparent from the following detailed description, claims and drawings. However, it should be understood that the detailed description and specific examples, while indicating preferred embodiments of the invention, are given for illustrative purposes only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

The drawings disclose the preferred embodiment of the present invention. While the configurations according to the illustrated embodiment are preferred, it is envisioned that alternate configurations of the present invention may be adopted without deviating from the invention as portrayed. The preferred embodiments are discussed hereafter.

Figure 1:
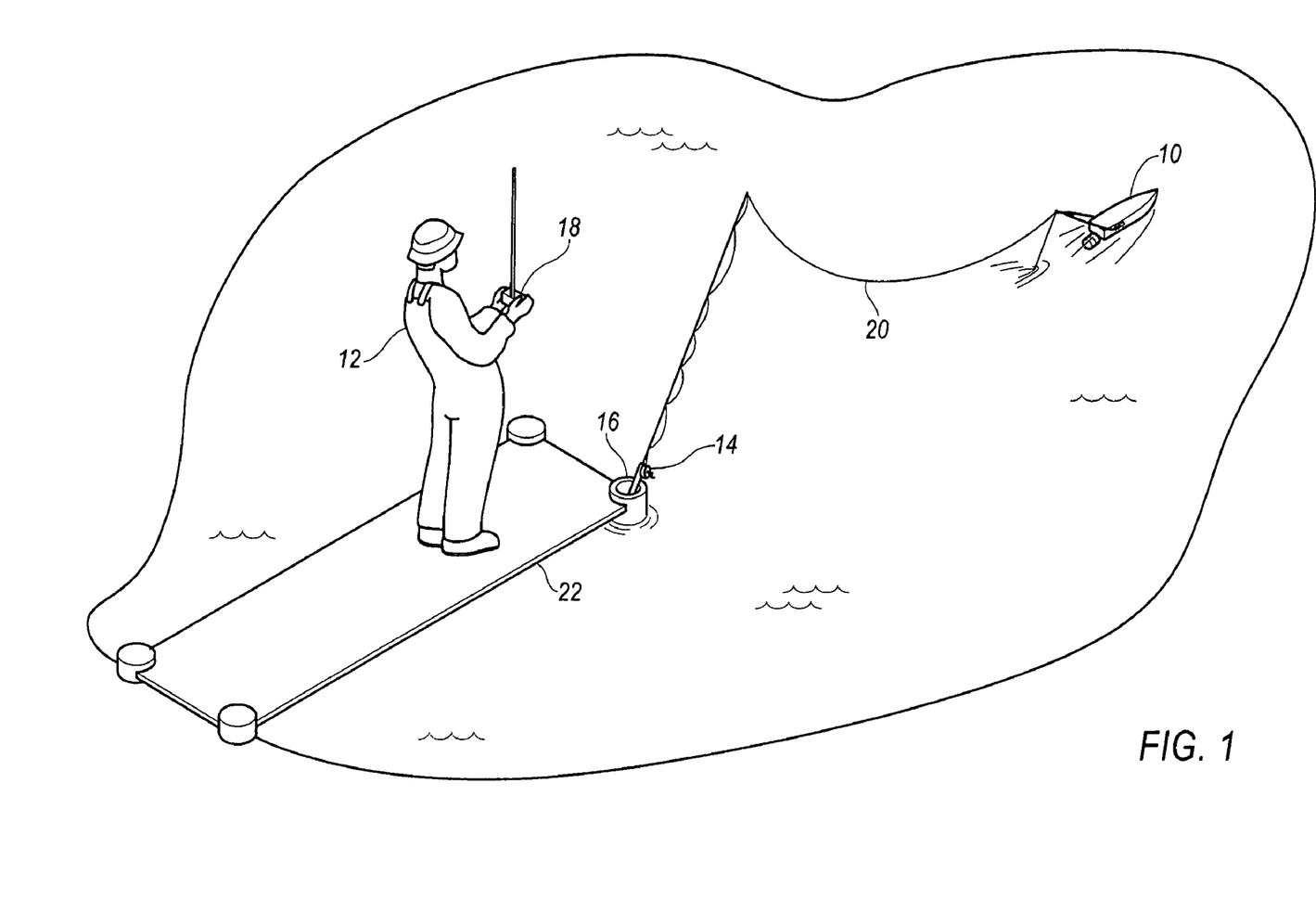
FIG. 1 illustrates a perspective view of the fishing apparatus of the present invention and an apparatus operator.

Referring first to FIG. 1, a perspective view of a remote controlled fishing apparatus of the present invention, generally indicated as 10, and an operator, generally indicated as 12, is shown. A fishing reel, generally illustrated as 14, is positioned in an optional fishing reel holder, generally illustrated as 16. As a preferred option, the fishing reel 14 is provided to hold the fishing reel 14 while the operator 10 manipulates the remote controlled fishing apparatus 10 by use of a hand-held remote control transmitter device 18. A fishing line 20 extends between the fishing reel 14 and the remote controlled fishing apparatus 10.

As shown, the operator 12 is positioned on a dock 22. Alternatively, the operator 12 may use the remote controlled fishing apparatus 10 from the shore or while positioned in the water in a boat (not shown). The present invention in this sense is highly flexible and will allow the operator 12 to operate the remote controlled fishing apparatus 10 from virtually any position on or near the water that is conceivable. The remote controlled fishing apparatus 10 of the present invention is so flexible that the position between the operator 12 and the remote controlled fishing apparatus 10 is limited only by the extent of the radio range of the hand-held remote control transmitter device 18.

Also as shown the operator 12 has placed the fishing reel 14 in the optional fishing reel holder 16. This is one approach to handling the remote controlled fishing apparatus 10. Alternatively, the operator 12 may be fishing from an alternate location such as a boat, as set forth above, and in such circumstances the fishing reel holder 16 may be attached to the boat in a known manner such as by clamping to a boat seat. As a further alternative, the operator 12 may hold the fishing reel 14 in one hand while manipulating the hand-held remote control transmitter device 18 in the other.

Figure 2:
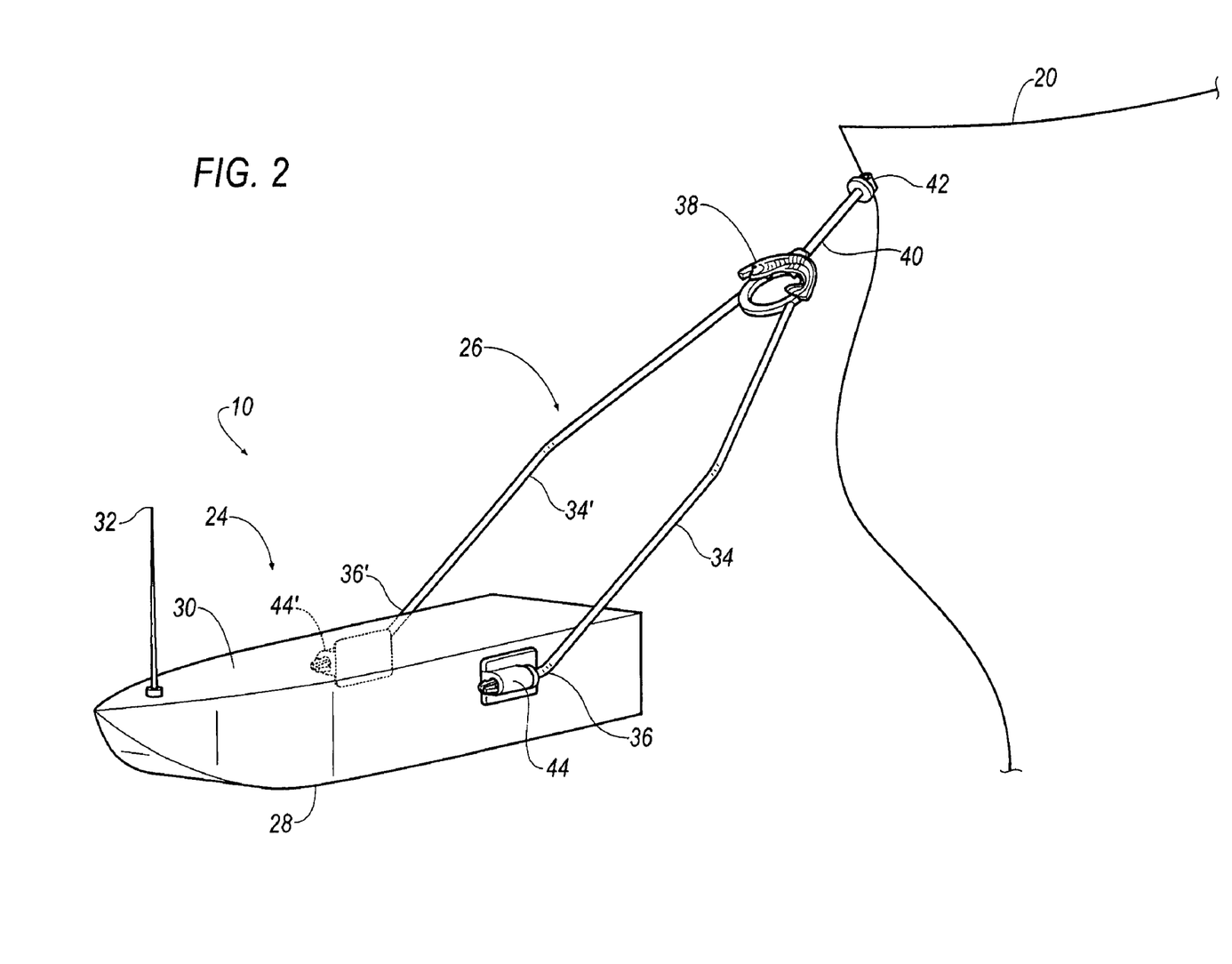
FIG. 2 illustrates a perspective view of the radio-controlled fishing apparatus illustrating the fishing boat and its attached fishing line guide.
Figure 3:
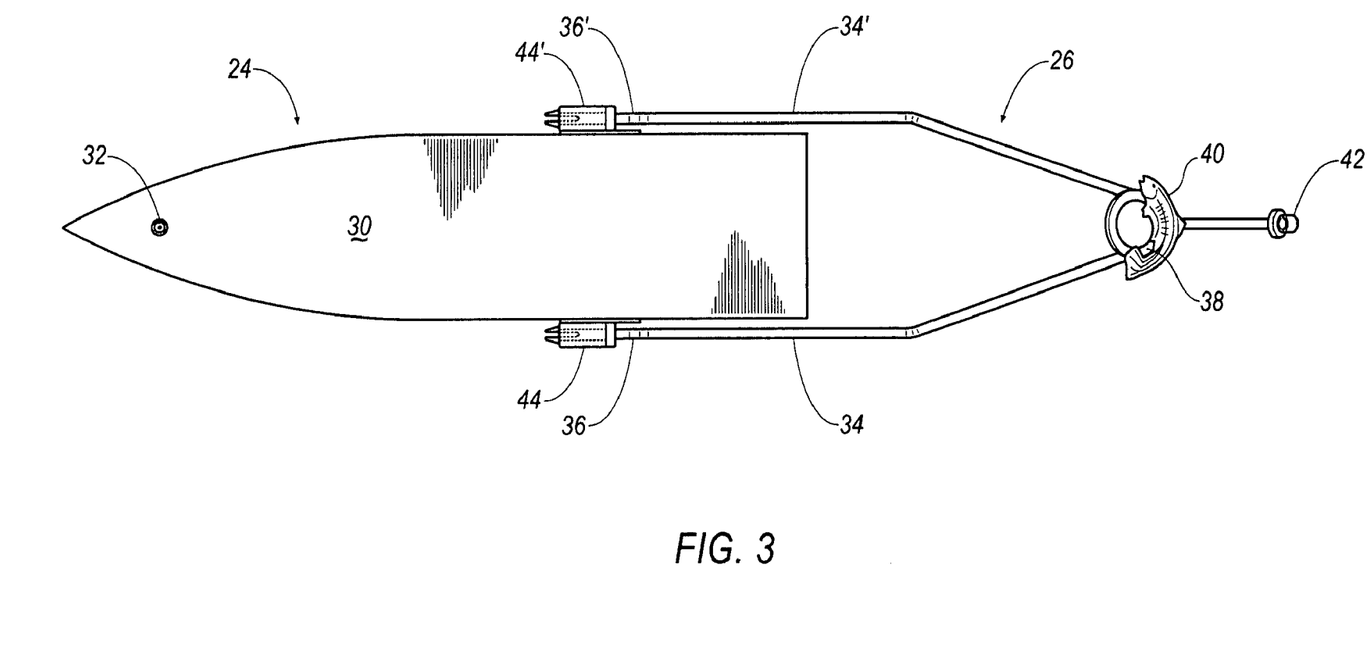
FIG. 3 illustrates a top plan view of the apparatus illustrated in FIG. 2.

Reference is now made to FIG. 2, in which a perspective view of the radio-controlled fishing apparatus 10 is illustrated, and FIG. 3, in which a top plan view of the radio-controlled fishing apparatus 10 of the present invention is illustrated. The radio-controlled fishing apparatus 10 includes a boat 24 and a fishing line guide 26. It is to be noted that the configuration of the boat 24 is exemplary and is not to be taken as limiting as a broad variety of other embodiments of the boat 24 may be employed while still accomplishing the goals of the present invention. The boat 24 generally includes a hull 28, a deck 30, and a radio control antenna 32. The other known elements of the radio controlled boat—the signal receiver, the steering apparatus, the motor, and the power source—are not illustrated but are understood to be present within the hull 28 and below the deck 30 as is known in the art.

The fishing line guide 26 includes a pair of like guide lines 34, 34' that terminate in one end at a pair of like hull connection ends 36, 36' and at the other end at a quick release attachment plate assembly 38 that comprises a quick release attachment support structure 40 and a quick release attachment plate 42. The fishing line guide 26 is attached to the boat hull 28 by a pair of mounting brackets 44, 44'. The fishing line guide 26 may be composed of a variety of materials, although a polymerized material is preferred for its lightweight, flexible and water-proof characteristics.

Figure 4:
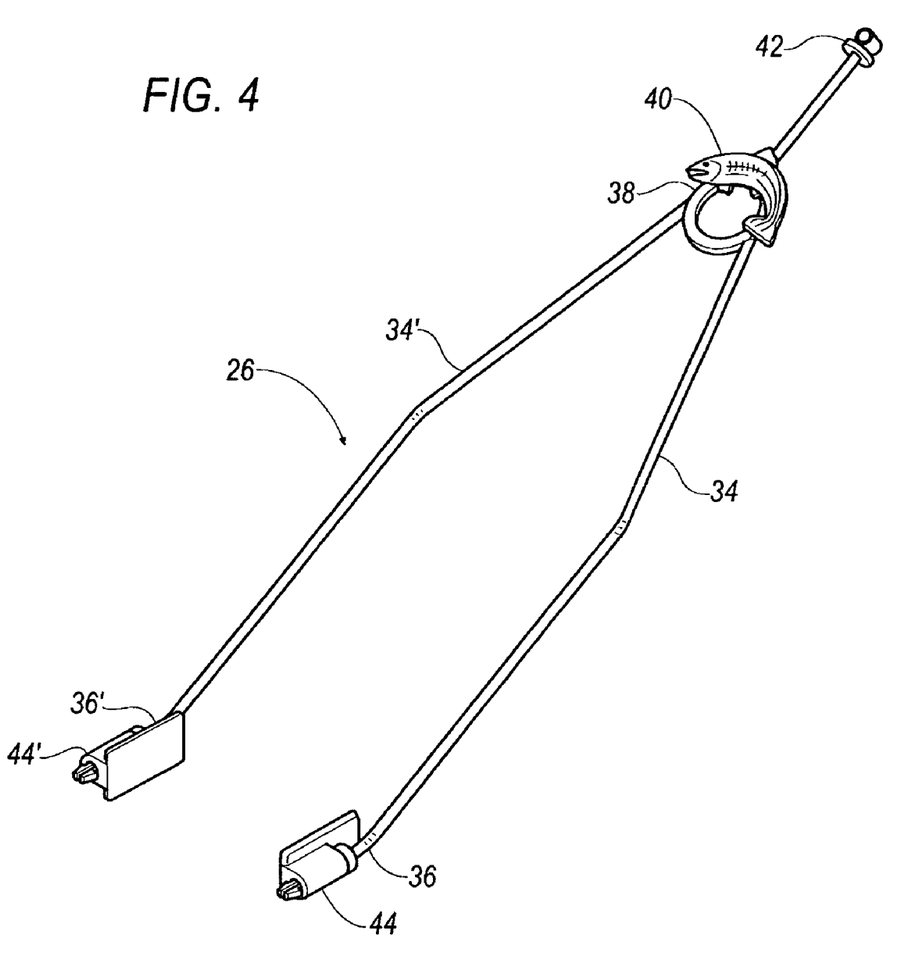
FIG. 4 illustrates a perspective view of the fishing line guide of the present invention.

FIG. 4 illustrates a perspective view of the fishing line guide 26 and its associated mounting brackets 44, 44'. As illustrated clearly by reference to mounting bracket 44', the bracket 44' includes a flat side (its inner or hull-facing side) which is provided for fixation to the boat hull 28 by a variety of fixing means, such as two-sided tape or an adhesive material. This arrangement is preferred because of its ease of attachment and because the boat hull 28 is not breached to achieve attachment. Of course, it is envisioned that the mounting brackets 44, 44' may be integrally molded into the boat hull 28 or, as a further alternative, may be eliminated altogether by a fastening method such as screwing or otherwise fastening the hull connection ends 36, 36' directly to the hull 28 by known methods. In any event, the attachment point of the hull connection ends 36, 36' to the hull 28 is at the approximate mid-point between the bow and the stern of the boat 24. This position selection is made to place the connection ends 36, 36' at the approximate center of gravity of the hull 28.

Figure 5A:
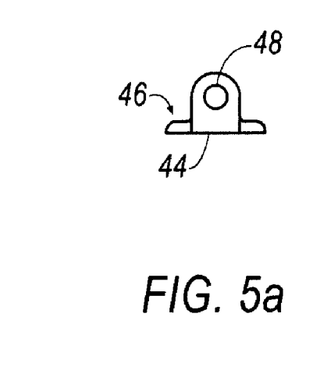
FIGS. 5a-5d illustrate partial and sectional views of the fastener assembly for fastening the fishing guide to the fishing boat.
Figure 5B:
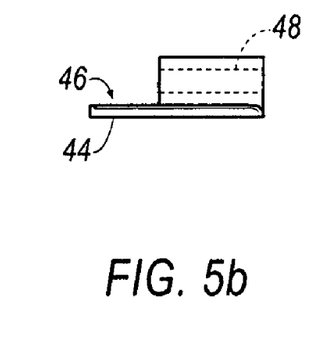
Figure 5C:
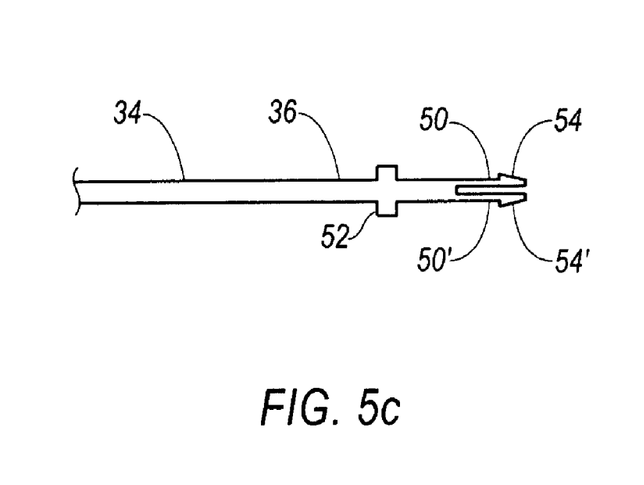
Figure 5D:
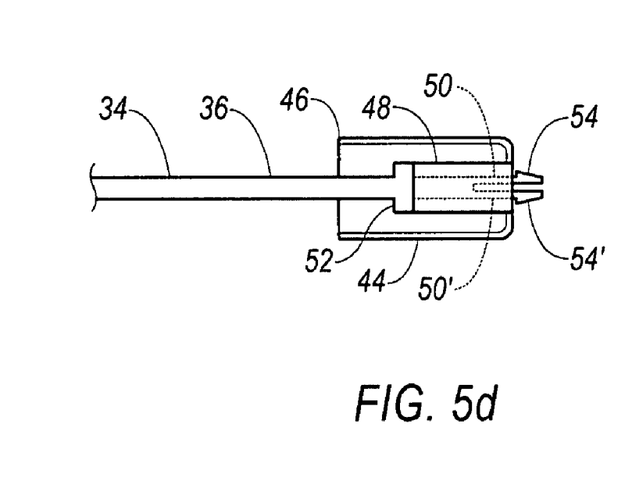

Referring to FIGS. 5a through 5b, detailed views of one of the brackets 44, 44' is illustrated. For the sake of simplicity, the bracket 44 is shown, with the hull connection end 36 also being described in detail. However, it is to be understood that the bracket 44' and the hull connection end 36' is the same in design and in operation.

The bracket 44 includes a base plate 46 which is attached to the boat hull 28 as set forth above. The bracket 44 further includes a substantially hollow hull connection end receptacle 48 shown in sectional view. The hull connection end 36 includes a pair of cantilevered, opposed and spaced-apart connecting arms 50, 50' which extend from a common connection at a connector fastening stop plate 52. At their opposite ends the spaced-apart connecting arms 50, 50' terminate respectively at snap ends 54, 54' which function to retain the spaced-apart connecting arms 50, 50' in position within the receptacle 48 in a known manner. According to this arrangement, and given the preferred construction of the fishing guide line 26 from a resilient polymerized material, the arms 50, 50' are sufficiently flexible so as to allow for insertion into the receptacle 48 and are snapped and held in place by restriction at one end of the connector fastening stop plate 52 and at their other end by the snap ends 54, 54'. The arms 50, 50' may be selectively released from the receptacle 48 by the snap ends 54, 54' being squeezed together and the arms 50, 50' being withdrawn from the receptacle 48.

The present invention provides a quick release feature which allows the fishing line 20 to be released from the fishing line guide 26 after the fish strikes the hook (neither shown). As discussed more completely below, the remote controlled fishing apparatus 10 may be adjusted to target a certain type of fish depending on the weight of the fish.

Figure 6:
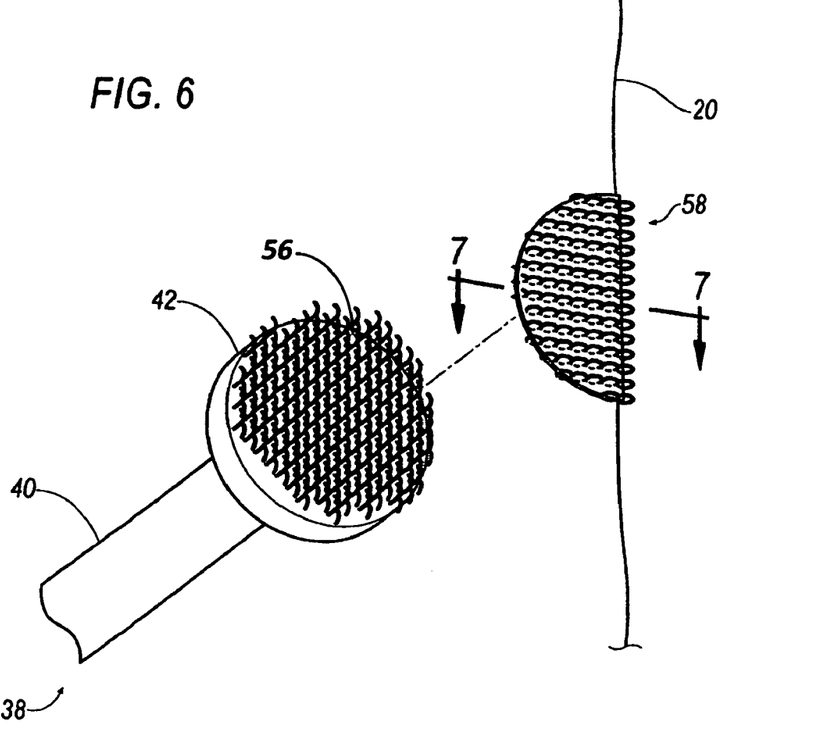
FIG. 6 illustrates a view of the quick-release attachment portion of the fishing guide and the quick-release pad attached to a portion of the fishing line.

With this feature in mind and referring to FIGS. 6 through 9, these figures illustrate in detail the quick-release arrangement of the present invention and underscore the flexibility of the present invention. FIG. 6 illustrates a view of the quick-release attachment plate assembly 38 and its associated quick release attachment support structure 40 which terminates in a quick release attachment plate 42. The face of the quick release attachment plate 42 is fitted with a quick release material 56. Preferably this material is one or the other of a hook or loop fastener material.

Figure 7:
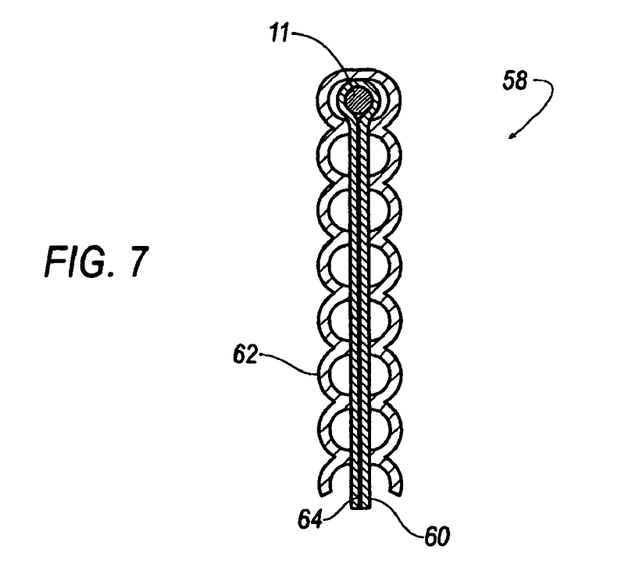
FIG. 7 is a sectional view of the quick-release pad taken along lines 7-7 of FIG. 6 to illustrate the pad and the portion of the fishing line captured by the pad.

A fishing line quick release pad 58 is attached to a selected portion of the fishing line 20. As illustrated in FIG. 7 which shows a cross section of the fishing quick release pad 58 taken along lines 7-7 of FIG. 6, the fishing line quick release pad 58 includes a flexible pad body 60 covered by a quick release material 62 that is the other of the hook or loop fastener material used as the quick release material 56 on the face of the quick release attachment plate 42. As illustrated by FIGS. 6 through 9, the fishing quick release pad is a pad of a selected shape of material (while round shape is illustrated, square or rectangular shape may well be selected) that has been folded over to capture the line 20 therebetween. An adhesive material 64 is provided on the backside of the fishing quick release pad 58. In use, the operator 12 selects a desired point on the fishing line 20 from the hook end (not illustrated) and folds the quick release pad 58 thereover, effectively capturing the line 20 by the quick release pad 58. Thereafter the quick release pad 58 may be adjusted one way or the other on the line 20 to accommodate the particular needs of the circumstance, such as to direct the hook and bait to a particular depth of the water to the level of the sought-after fish.

Figure 8:
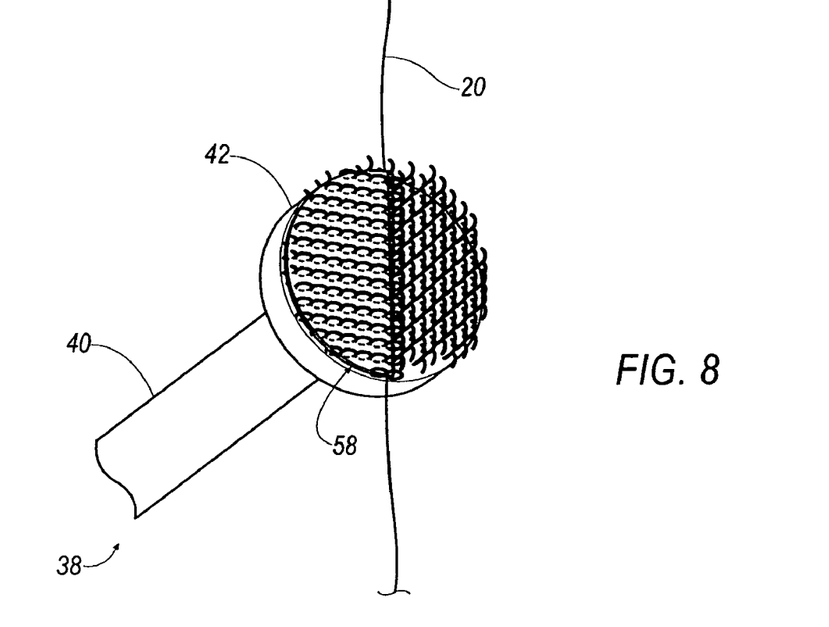
FIG. 8 illustrates a front view of the quick-release pad/fishing line attached to the quick-release portion of the fishing guide according to a first preferred release method.
Figure 9:
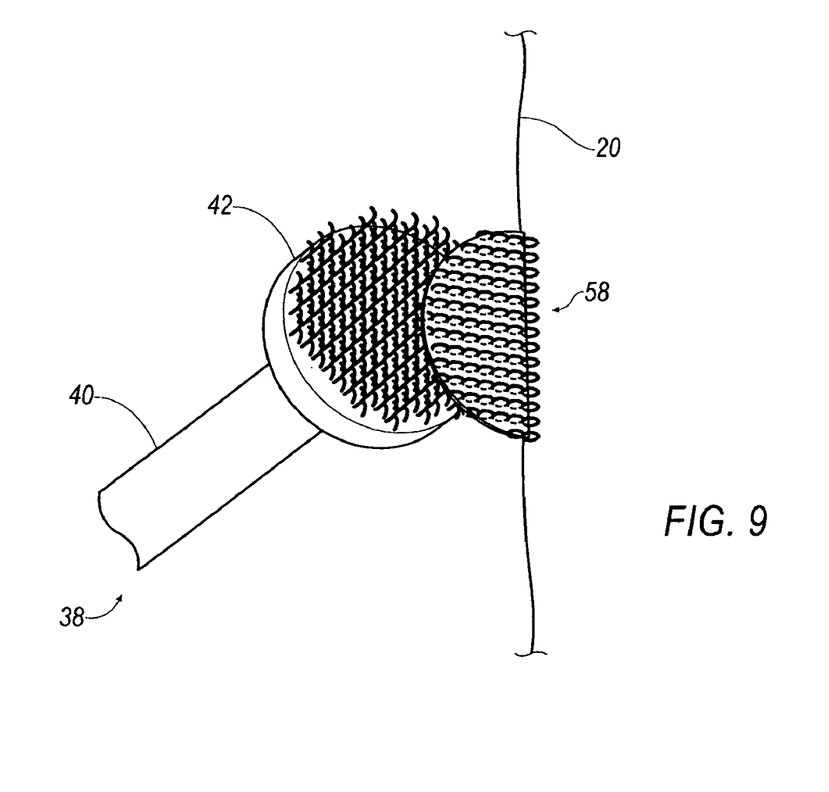
FIG. 9 illustrates a view similar to that shown in FIG. 8 but illustrating the quick-release pad/fishing line attached to the quick-release portion of the fishing guide according to a second preferred release method.

Once the quick release pad 58 has been folded over to capture the fishing line 20 at a desired place, the quick release pad 58 is releasably attached to the face of the quick release attachment plate 42. It is this attachment which determines the release capacity of the apparatus 10. As shown in FIG. 8, the attachment side of the quick release pad 58 has been entirely fitted to the face of the quick release attachment plate 42. This placement provides the apparatus 10 with maximum resistance to detachment and would be selected for the largest, heaviest fish being sought. From this extreme attachment arrangement, less than the full face of the quick release pad 58 may be attached to the quick release attachment plate 42. For example, and as illustrated in FIG. 9, only a portion of the quick release pad 58 has been attached to the quick release attachment plate 42. This arrangement would be selected for smaller, lighter fish where a lesser release strength is desired.

FIGS. 10 through 14 illustrate further embodiments of the design of the present invention. According to these embodiments, an elongated quick release element 66 is illustrated and includes an outer side 68 having one or the other of a hook or loop fastening material formed thereon. Through the center of the element 66 is provided an aperture through which is threaded a portion of the line 20. The line 20 is looped around the element 66 to secure it thereto, thus preventing the line 20 from freely passing through the element 66.

Figure 10:
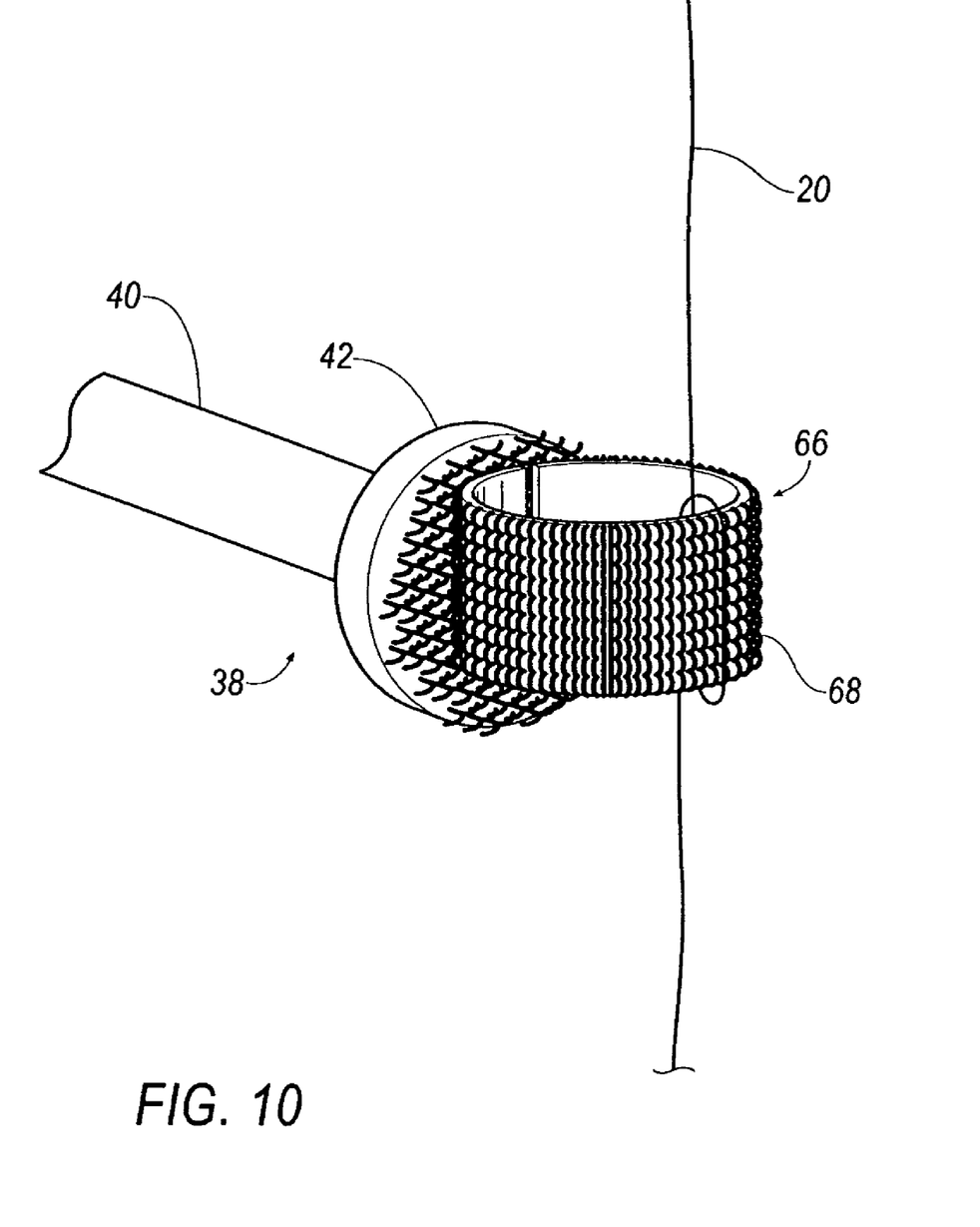
FIG. 10 is a perspective view illustrating a further embodiment of the present invention illustrating a further method of attaching a quick-release pad/fishing line to the quick-release portion of the fishing guide.
Figure 11:
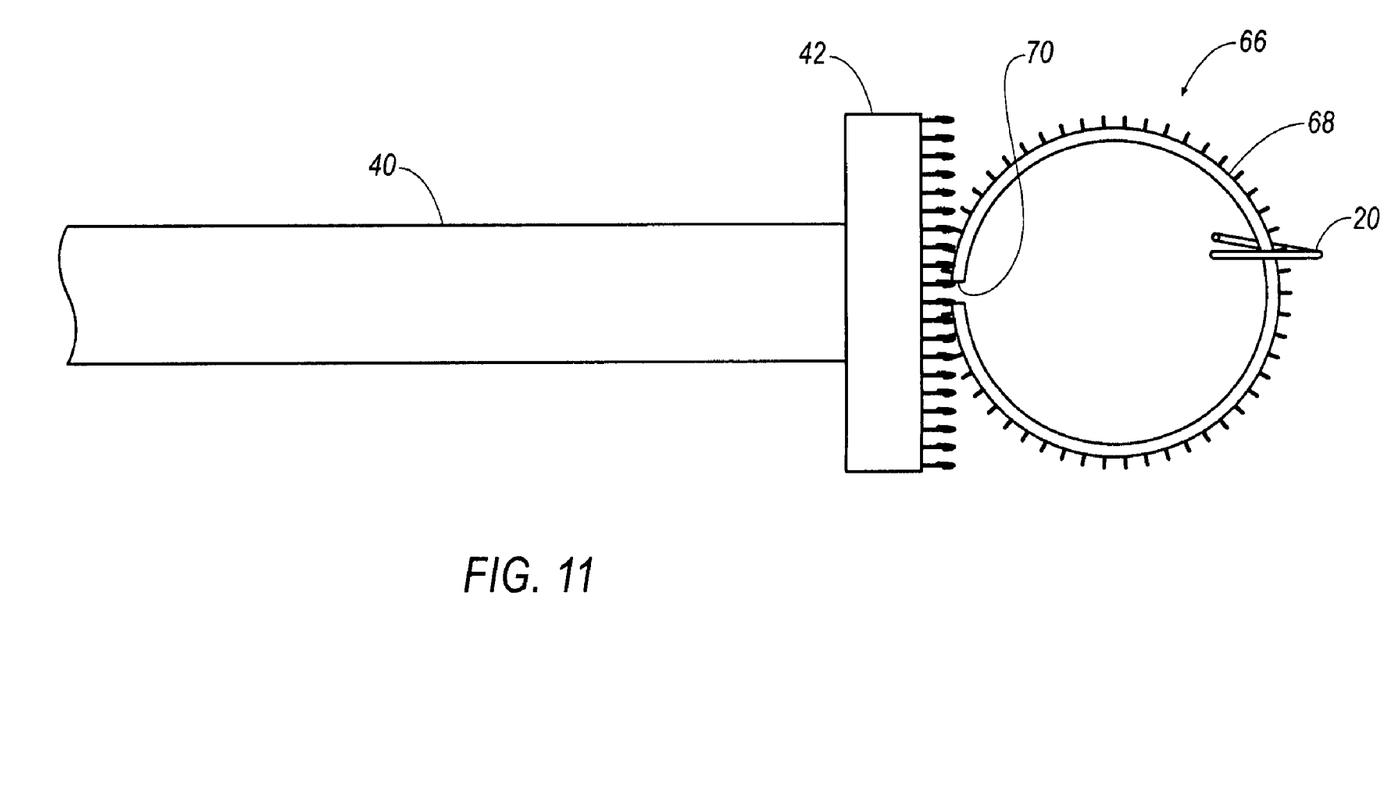
FIG. 11 is a plan view of one end of a quick-release pad/fishing line and quick-release assembly according to the embodiment of FIG. 10.
Figure 12:
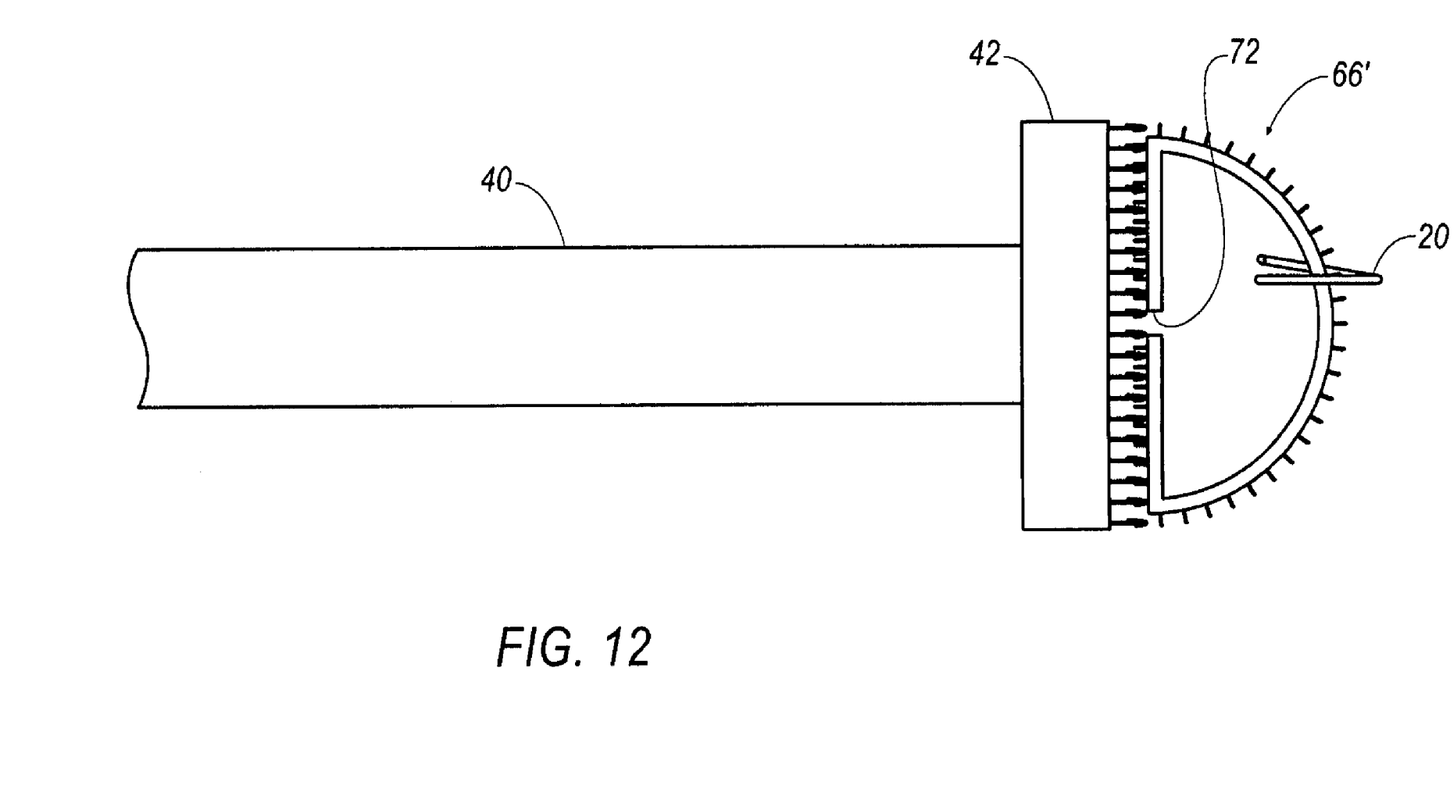
FIG. 12 is a plan view similar to that of FIG. 11 but showing an alternate configuration of the fishing line holder.
Figure 13:
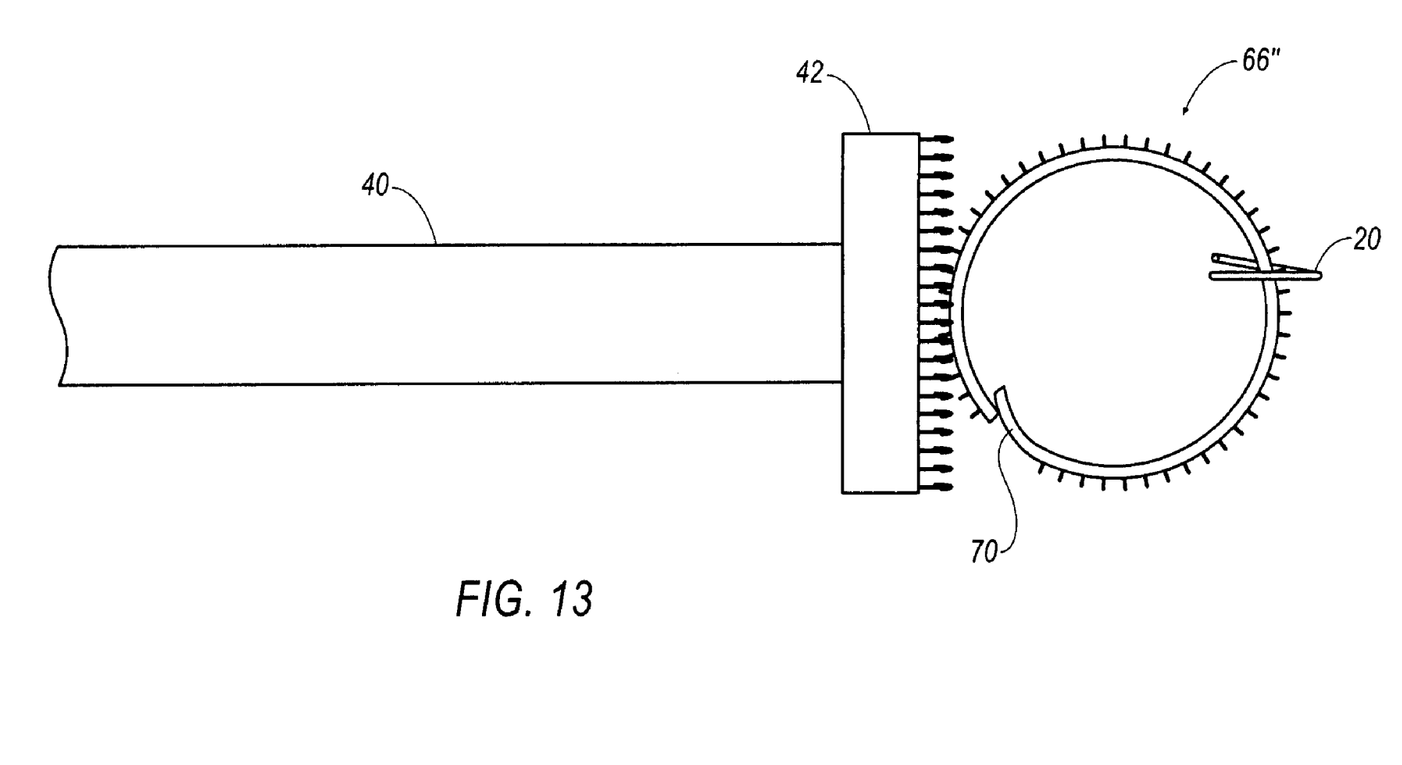
FIG. 13 is also a plan view similar to that of FIG. 11 but illustrating an overlapping method of retaining the fishing line.

FIGS. 11 through 13 illustrate plan views of various configurations of the element 66. More particularly, FIG. 11 illustrates the plan view of the element 66 according to the configuration of FIG. 10. As shown, the line 20 is looped around the wall of the element 66. To place the line 20 in its looped position the element 66 is slotted, as illustrated by slot 70. In operation, the user places a loop of the line 20 around the body of the element 66 then attaches the element 66 to the attachment plate 42 such that the slot is "closed" by connection of the element 66 thereto as illustrated in FIG. 11.

FIG. 12 illustrates a further embodiment of the present invention and shows a variation of element 66, in this case element 66', which is attached to the attachment plate 42 in the same manner as shown above with respect to the embodiment of FIGS. 10 and 11. As shown, a gap 72 is defined by the two adjacent portions of the element 66'. The line 20 is looped on the element 66' in the same manner as described above with respect to FIGS. 10 and 11.

FIG. 13 illustrates an additional embodiment of the present invention and shows a further variation of element 66, in this case element 66'', in which the adjacent open walls of the element 66'' are overlapped to restrict movement of the line 20 at an overlapping area 74. The line 20 is looped on the element 66'' in a manner similar to that shown and described above with respect to FIGS. 10 and 11, with the exception that the walls are overlapped as shown.

Figure 14:
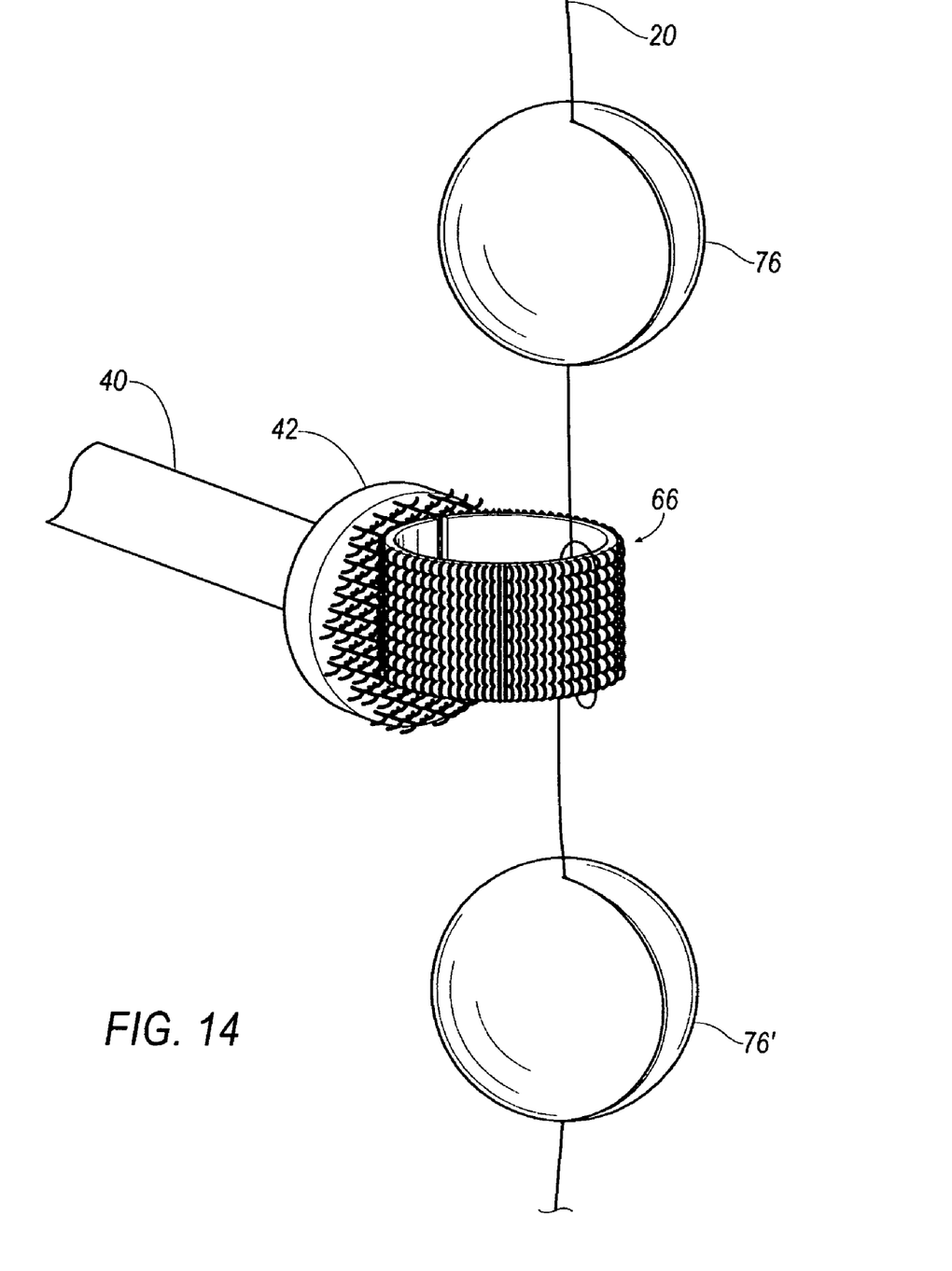
FIG. 14 is a further embodiment of the present invention illustrating an alternative method for retaining the fishing line.

FIG. 14 illustrates a further method of restricting movement of the line 20 through the element 66 of FIGS. 10 and 11. According to this embodiment, a pair of spaced apart retainers 76, 76' are secured to the line 20 by methods such as crimping or gluing in a known manner such that the element 66 is captured therebetween. According to this method the movement of the line 20 is restricted.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. An apparatus for use with a fishing line, the apparatus comprising:
a fishing line guide including a quick release attachment plate, said fishing line guide including a pair of guide lines, each of said guide lines having a connector end and a quick release attachment plate end, each of said guide lines having a first section, a second section, and a third section, said first sections diverging from each other from said quick release attachment plate ends toward said second sections, said second sections extending from said first sections at first angles, said third sections extending from said second sections at second angles and terminating at said connector ends, said connector ends being spaced apart from each other and said quick release plate ends being joined both together and to said quick release attachment plate, each of said connector ends including a pair of cantilevered, opposed and spaced-apart connecting arms and a connector fastening stop plate extending transversely to a respective third section, each pair of said connecting arms being commonly connected at said connector fastening stop plate, each of said spaced-apart connecting arms including a protruding element that defines a snap end which protrudes transversely to a respective third section; and
a pair of fishing line guide attachment mounting brackets, each of said pair of mounting brackets including a base and a substantially hollow connection end receptacle, said protruding elements defining said snap ends and said stop plates having lateral dimensions which are larger than each of said hollow connection end receptacles, each respective pair of said connecting arms being releasably attachable to a respective connection end receptacle when said each respective pair of said connecting arms is inserted into said respective connection end receptacle with said respective connection end receptacle being positioned between said snap ends of a respective pair of spaced-apart connecting arms and a respective stop plate.

2. The apparatus for use with a fishing line of claim 1, wherein said quick release surface of said attachment plate is one of a hook or loop material, and wherein said quick release surface of said fishing line quick-release element being the other of said hook or loop material.

3. The apparatus for use with a fishing line of claim 1, wherein said fishing line guide is composed of a polymerized material.

4. The apparatus for use with a fishing line of claim 1, wherein said quick release attachment plate has a quick release surface.

5. The apparatus for use with a fishing line of claim 4, further comprising:
a fishing line quick-release element fittable to the fishing line, the quick-release element being releasably attachable to said quick release attachment plate of said fishing line guide, said fishing line quick-release element including a quick release surface, said quick release surface of said fishing line quick-release element being attachable entirely or at least in part to said quick release surface of said quick release attachment plate of said fishing line guide.

6. The apparatus of claim 1, wherein each of said pair of fishing line guide attachment mounting brackets being attachable to a fishing line guide attachment surface, each of said bases being attachable to said fishing line guide attachment surface.

7. A remote controlled fishing apparatus for use with a fishing line, the apparatus comprising:
a fishing line guide attachable to a remote controlled boat, said fishing line guide including a quick release attachment plate, said quick release attachment plate having a quick release surface, said quick release surface being one of a hook or loop material, said fishing line guide including a pair of guide lines, each of said guide lines having a connector end and a quick release attachment plate end, each of said guide lines having a first section, a second section, and a third section, said first sections diverging from each other from said quick release attachment plate ends toward said second sections, said second sections extending from said first sections at first angles, said third sections extending from said second sections at second angles and terminating at said connector ends, said connector ends being spaced apart from each other and said quick release plate ends being joined both together and to said quick release attachment plate, each of said connector ends including a pair of cantilevered. opposed and spaced-apart connecting arms and a connector fastening stop plate extending transversely to a respective third section, each pair of said connecting arms being commonly connected at said connector fastening stop plate, each of said spaced-apart connecting arms including a protruding element that defines a snap end which protrudes transversely to a respective third section;
a fishing line quick-release element fittable to the fishing line, the quick release element being releasably attachable to said quick release attachment plate of said fishing line guide, said fishing line quick-release element including an attachment surface, said attachment surface being the other of said hook or loop material; and
a pair of fishing line guide attachment mounting brackets, each of said pair of mounting brackets including a base and a substantially hollow hull connection end receptacle, said protruding elements defining said snap ends and said stop plates having lateral dimensions which are larger than each of said hollow hull connection end receptacles, each respective pair of said connecting arms being releasably attachable to a respective connection end receptacle when said each respective pair of said connecting arms is inserted into said respective connection end receptacle with said respective connection end receptacle being positioned between said snap ends of a respective pair of spaced-apart connecting arms and a respective stop plate.

8. The remote controlled fishing apparatus of claim 7, wherein said fishing line quick-release element is attachable entirely or at least in part to said quick release attachment plate of said fishing line guide.

9. The remote controlled fishing apparatus of claim 7, wherein said fishing line guide is composed of a polymerized material.

10. The remote controlled fishing apparatus of claim 7, wherein said fishing line quick-release element is a generally tubular member through which the fishing line is passable, said generally tubular member having an outer side which defines said attachment surface.

11. The remote controlled fishing apparatus of claim 10, wherein said element includes a wall about which a portion of the fishing line is loopable.

12. The remote controlled fishing apparatus of claim 10, further including a pair of spaced apart elements which are fittable to the fishing line and which are disposable on either side of said element.

13. The remote controlled fishing apparatus of claim 7, further comprising a remote controlled boat.

14. The remote controlled fishing apparatus of claim 13, wherein said boat further includes a fishing line guide attachment surface, each of said pair of fishing line guide attachment mounting brackets being attached to said fishing line guide attachment surface, each of said bases being attached to said fishing line guide attachment surface.

* * * * *